United States Patent [19]
Fairbanks

[11] 3,993,316
[45] Nov. 23, 1976

[54] OVERHEAD SIGNAL PICKUP DEVICE
[75] Inventor: David William Fairbanks, Monmouth Junction, N.J.
[73] Assignee: RCA Corporation, New York, N.Y.
[22] Filed: Mar. 10, 1975
[21] Appl. No.: 557,178

[52] U.S. Cl. .......................... 274/23 A; 178/6.6 R; 179/100.1 B
[51] Int. Cl.[2] .......................................... G11B 3/36
[58] Field of Search ............... 274/23 A; 178/6.6 R, 178/6.6 A; 179/100.1 B, 100.4 G

[56] References Cited
UNITED STATES PATENTS

| | | | |
|---|---|---|---|
| 2,166,986 | 7/1939 | Dally | 274/23 A |
| 2,556,421 | 6/1951 | Gee | 274/23 R |
| 3,249,362 | 5/1966 | Rabinon | 274/23 A |
| 3,261,610 | 7/1966 | Wagner | 274/23 A |
| 3,622,163 | 11/1971 | Bachman | 274/23 A |
| 3,767,848 | 10/1973 | Schuller et al. | 274/23 A |

*Primary Examiner*—Steven L. Stephan
*Attorney, Agent, or Firm*—Eugene M. Whitacre; William H. Meagher; Dilip A. Kulkarni

[57] ABSTRACT

In a video disc player including a base, an information disc record mounted on a turntable for rotation relative to the base, a support housing carrying a signal pickup, and a lid for supporting the support housing, an overhead signal pickup drive is provided. A centering collar is rotatably suspended in the lid by a plurality of spring elements such that, when the lid is secured onto the base for playback, the axis of rotation of the collar coincides with that of the turntable. A plurality of friction pads are affixed to the collar such that, when the lid is closed, the friction pads are pressed against the unrecorded surface of the disc record and thereby transmitting rotation of the disc record to the collar when the player is operative. The rotation of the collar is transformed into a linear motion of the support housing, carrying the signal pickup, by various right-angle drives and clutch arrangements. A servo system is provided for maintaining a substantially constant attitude of the signal pickup, with respect to the information groove in the disc record, during playback. A thumbwheel is provided for adjusting the position of the signal pickup with respect to the disc record for selecting a particular program. A separate motor is provided for the purpose of a rapid approach or return of the support housing from or to a rest position.

15 Claims, 8 Drawing Figures

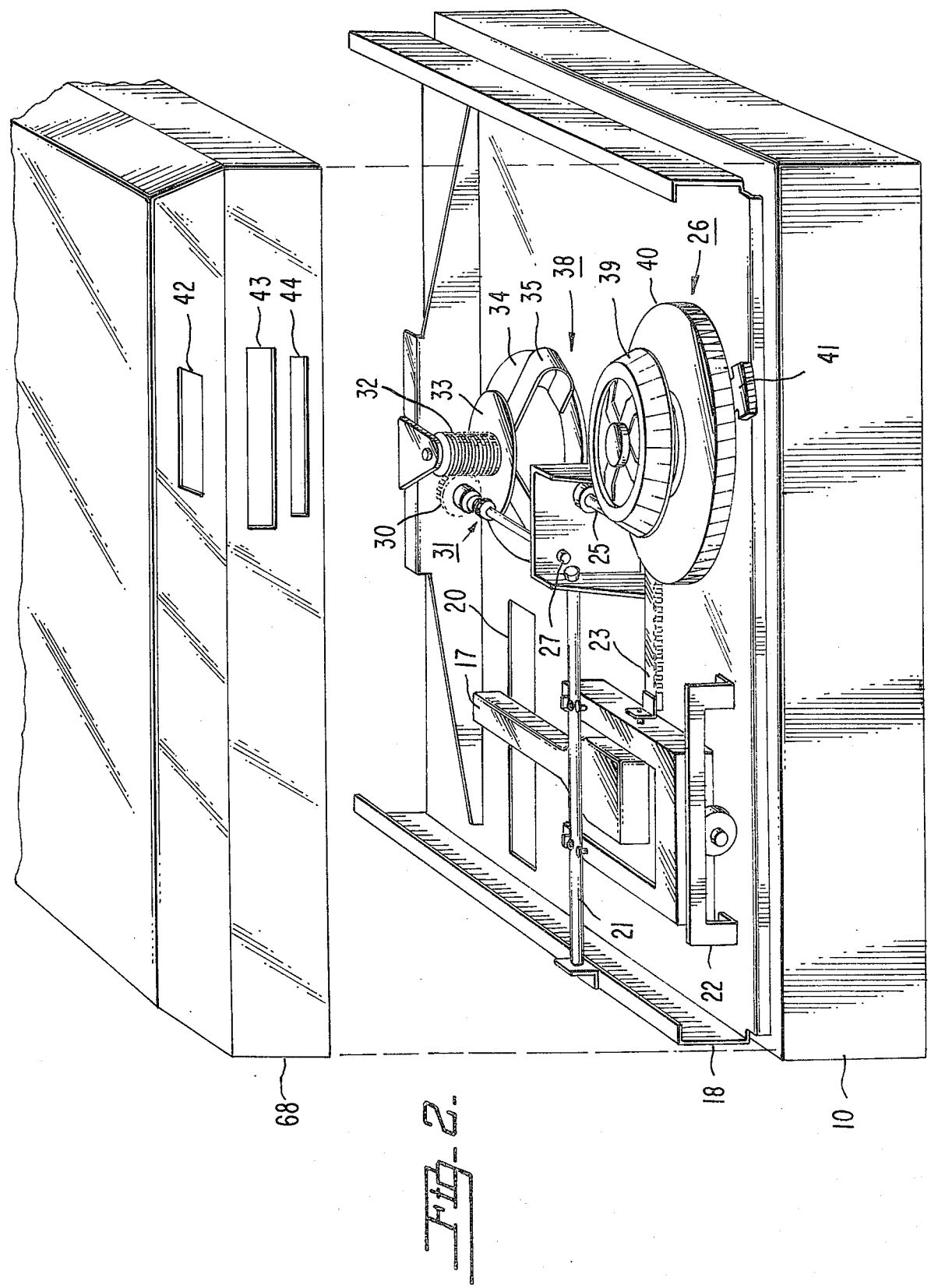

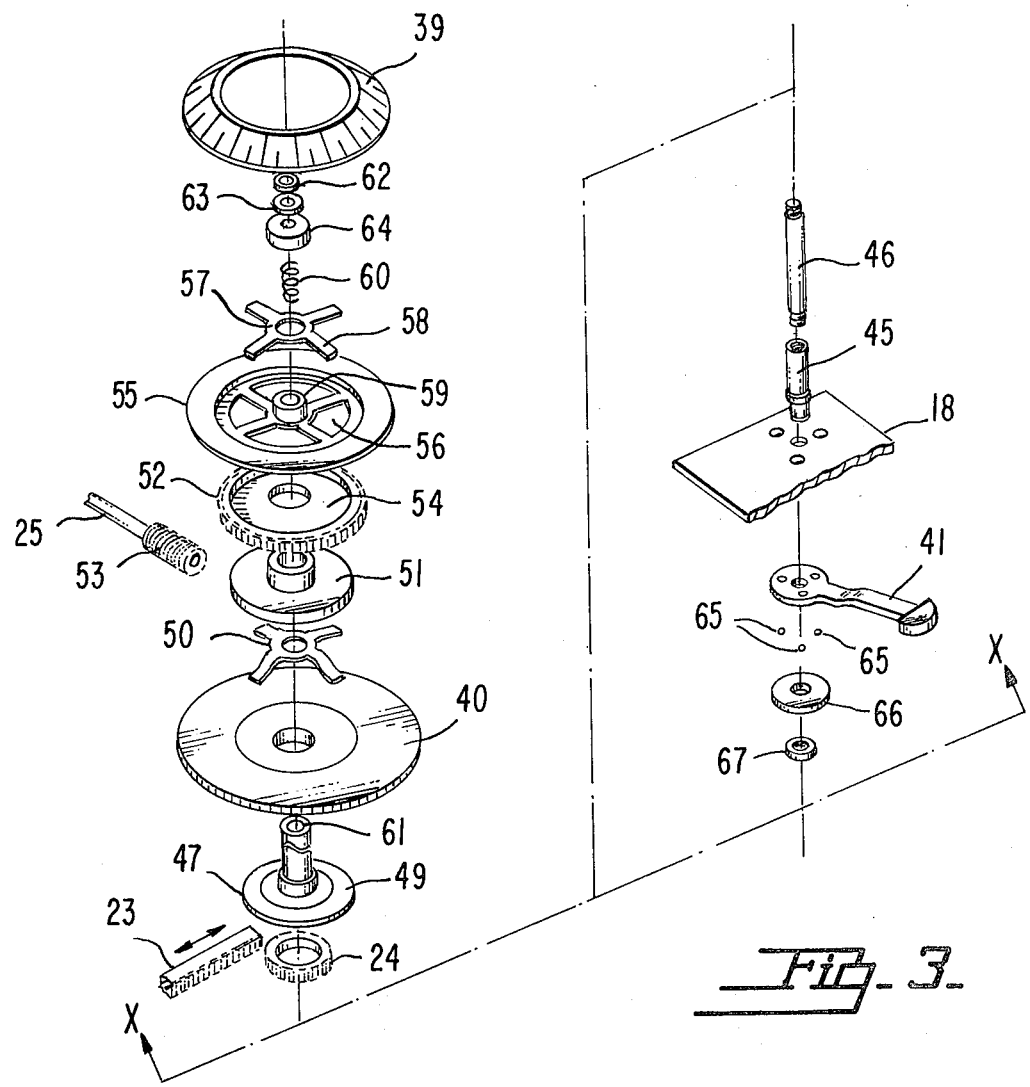
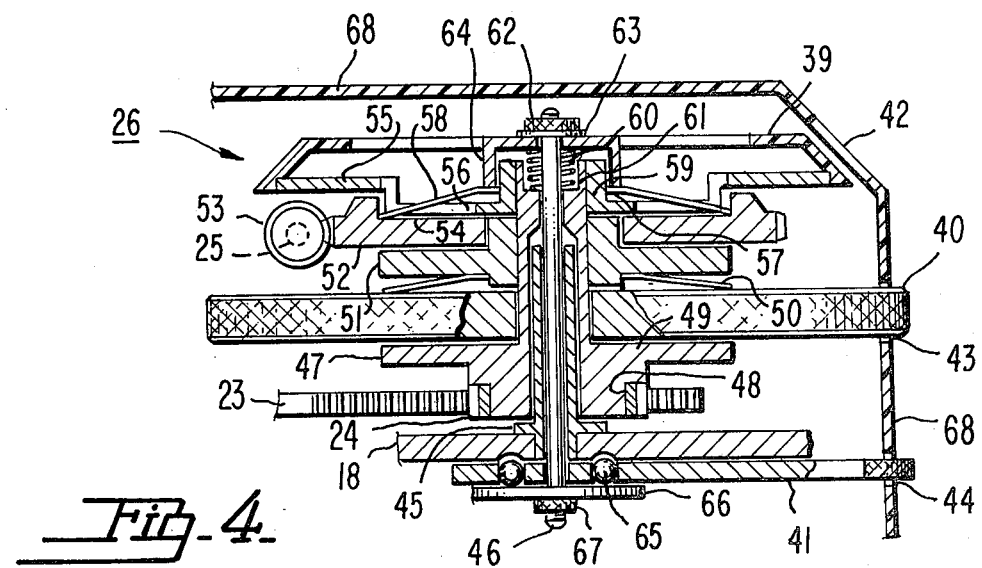

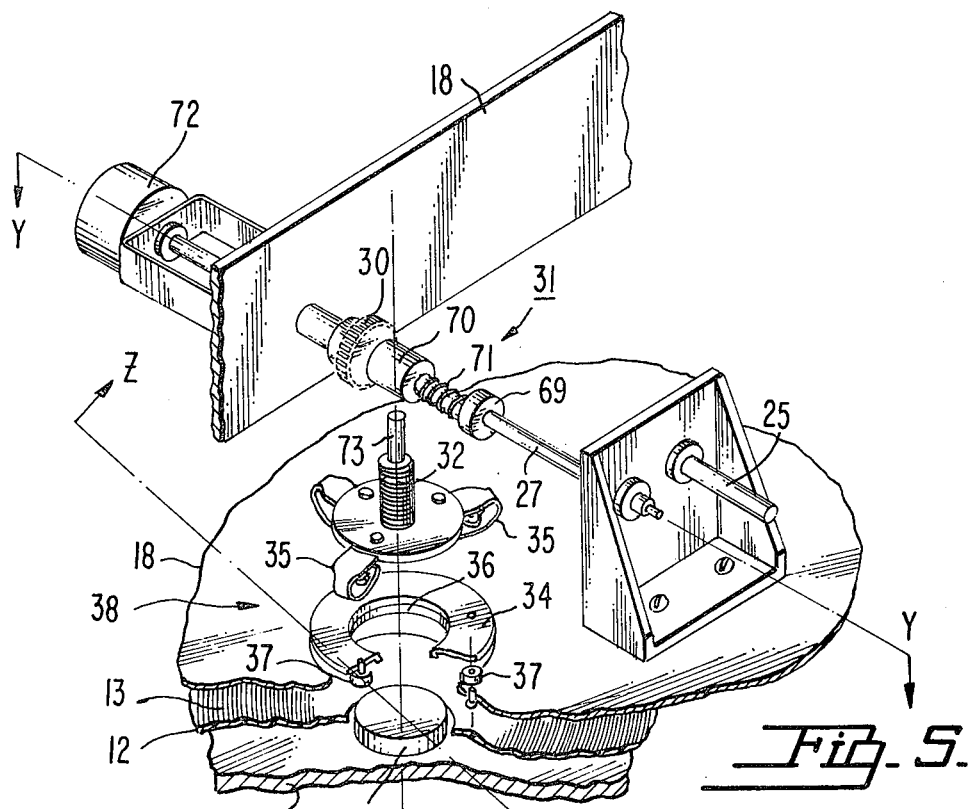
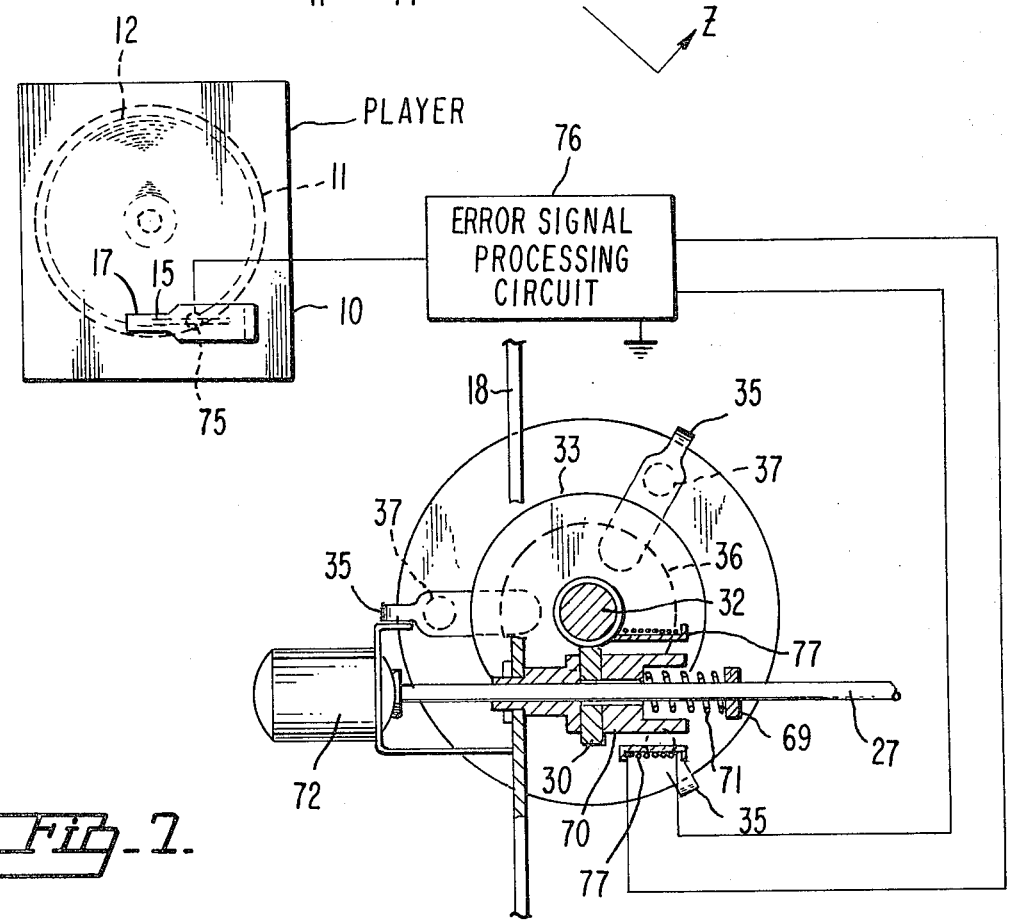

OVERHEAD SIGNAL PICKUP DEVICE

This invention pertains to an overhead signal pickup drive compatible with the requirements of a video disc system.

BACKGROUND OF THE INVENTION

In certain video disc systems, video information is recorded by means of geometric variations in the bottom of a smooth spiral groove on the surface of a disc record. The disc record surface includes a coating of conductive material which is preferably covered with a thin deposit of dielectric material. A signal pickup subject to engagement with the spiral groove includes a conductive surface which cooperates with the conductive coating and the dielectric deposit of the disc record, to form a capacitor. When the disc record is rotated, an edge of the conductive surface of the signal pickup, while riding in the disc record groove, recovers capacitive variations due to geometric variations in the bottom of the smooth spiral groove. The capacitive variations, which represent prerecorded video information, are processed and applied to a conventional television receiver for reproduction. The variable capacitor concept is described in detail in the copending U.S. Pat. No. 3,842,194, issued to J.K. Clemens, entitled "INFORMATION RECORDS AND RECORDING/PLAYBACK SYSTEMS THEREFOR", and assigned to the present assignee.

The capacitive variations, between the conductive coating on the disc record and the conductive surface of the signal pickup, are a part of a tuned circuit. The resonant frequency of the tuned circuit varies as the capacitance between the signal pickup and the disc record changes. A flexibly mounted conductive member (e.g., pickup arm) is provided; with its free end electrically and mechanically coupled to the conductive surface of the signal pickup, and its pivoted end movably connected to a hollow box-like support housing also made of conductive material. The conductive member mechanically supports the signal pickup, and also forms a transmission line with the surrounding conductive support housing. The tuned circuit includes the reactance of the transmission line and the capacitance between the signal pickup and the disc record. The tuned circuit is energized by a fixed, high frequency (for example, 915 MHz) oscillator. The response of the tuned circuit to the oscillator excitation signal changes as a function of prerecorded information on the disc record. The output signals from the tuned circuit, indicative of information prerecorded on the disc record, are subsequently applied to a suitable signal processing circuit coupled to a television receiver. The transmission line concept is described in detail in the U.S. Pat. No. 3,872,265, issued to S. E. Hilliker, on Mar. 18, 1975, entitled "VIDEO DISC TRANSMISSION LINE AND STYLUS RF RETURN SYSTEMS", and assigned to the present assignee.

The support housing, carrying the pickup arm assembly, is mounted on a suitable feed drive mechanism for driving the pickup arm assembly transversely across the disc record in proper time relationship with the rotational speed of the disc record. The feed drive mechanism drives the signal pickup radially inward toward the center of rotation of the disc record such that the attitude of the signal pickup conductive surface is held relatively constant with respect to the groove. It must be noted that a positive feed drive mechanism is desirable as relatively fragile walls of video disc record grooves, (for example, in a disc record having 4,000 to 6,000 grooves per inch) used in the aforementioned Clemens' type systems, cannot be dependably relied upon for tracking (that is, pulling the pickup arm assembly across the recorded surface of the disc record). It is an object of the present invention to provide an improved and novel feed drive mechanism which is simple in construction, easy to manufacture at a low cost, reliable in operation, and compatible with the requirements of video disc systems.

In a system using the above-discussed high frequency (for example, 915 MHz) transmission line and associated circuits it is desirable to provide effective shielding for radiation at the frequencies employed in order to avoid deleterious interference with the ambient electronic equipment. An advantageous shielding arrangement can be obtained when the supporting housing and the pickup arm circuits are semi-permanently sealed in a metal enclosure, such as a lid of the playback apparatus with an appropriate opening for allowing the signal pickup to ride in the disc record groove, as disclosed in the copending application of Marvin A. Leedom, Ser. No. 557,180, entitled "OVERHEAD SIGNAL PICKUP DRIVE AND DISC RECORD GROUNDING APPARATUS" and concurrently filed herewith. One of the aspects of the present invention is provision of a novel radial drive mechanism for the support housing carrying the pickup arm assembly which is compatible with the aforesaid advantageous shielding arrangement for a video disc system.

In a conventional playback apparatus the pickup arm carrying the signal pickup moves to and from a rest position which is located at a distance greater than the disc record radius from the center of the turntable. Therefore, each time a disc record is played, the pickup arm makes wasteful movements to clear the disc record played: for example, from the rest position to a play position at the beginning of a playback cycle and from the play position to the rest position at the end of a playback cycle. Another purpose served by the present invention is elimination of these wasteful movements of the pickup arm assembly. The novel drive mechanism of the present invention permits location of the pickup arm assembly in the lid whereby it is unnecessary for the pickup arm to clear the disc record between playback cycles.

SUMMARY OF THE INVENTION

In a playback system including a base, a disc record mounted on a turntable for rotation relative to the base, wherein the disc record has a spiral groove with information recorded therein, a pickup arm carrying a signal pickup, a support housing supporting the pickup arm, wherein the signal pickup is subject to positioning with respect to the disc record groove for playback, and a lid for supporting the support housing assembly, an overhead signal pickup drive is provided. Bearing means, attached to the lid, is provided for reciprocably supporting the support housing. A rack, connected to the support housing, engages a pinion rotatably mounted in the lid. A drive shaft, also rotatably supported in the lid, couples the pinion to a wormwheel. A wormgear, rotatably suspended in the lid, engages the wormwheel. A drive plate, connected to the wormgear, is rotatably suspended such that when the lid is secured onto the base for playback the axis of rotation of the drive plate substantially coincides with the axis of rotation of the disc record. A centering collar is concentrically suspended from the drive plate by a plurality of spring elements. A plurality of friction pads are affixed to the centering collar on the side opposing the drive plate, such that, when the lid is secured onto the base, the friction pads are pressed against the unrecorded surface of the disc record, thereby enabling rotational movement of the disc record to be transmitted to the centering collar when the player is operative. Thus, the rotation of the disc record is transformed into a linear motion of the support housing carrying the signal pickup. According to a further feature of the invention the coupling between the wormwheel and the drive shaft comprises a clutch mechanism. According to a still further feature of the invention, the extent of the slip movement, between the wormwheel and the drive shaft, is controlled in a manner that keeps the pickup arm, carrying the signal pickup, tangential to the information groove at the point of engagement of the signal pickup with the disc record groove. According to another feature of the invention, the coupling between the pinion and the drive shaft also comprises a clutch mechanism. After decoupling the pinion from the drive shaft and disengaging the signal pickup from the disc record groove, a thumbwheel is used for adjusting the position of the support housing for the purpose of selecting a particular program on the disc record. According to still another feature of the invention, a separate motor is connected to the drive shaft for overpowering the rotational motion of the drive shaft, obtained from the disc record, for a rapid approach or return of the support housing while the signal pickup is disengaged from the disc record groove.

BRIEF DESCRIPTION OF THE DRAWINGS

The objects and advantages of the present invention will be recognized by those skilled in the art upon reading of the following detailed description and inspection of the accompanying drawings in which:

FIG. 2 is a partial perspective view of the video disc system of FIG. 1, and wherein the cover is removed from the lid frame for clarity;

FIG. 3 is an oblique exploded view of a portion of the overhead signal pickup drive of FIGS. 1 and 2;

FIG. 4 is a sectional elevation of the overhead signal pickup drive of FIG. 3 along the line X—X in FIG. 3;

FIG. 5 is a perspective exploded view of the remainder of the overhead signal pickup drive of FIGS. 1 and 2;

FIG. 7 illustrates a servo system, partially in block form and partially sectioned for clarity, for maintaining the pickup arm tangential to the groove at the point of engagement suitable for use with the overhead signal pickup drive of FIGS. 1–6.

DETAILED DESCRIPTION OF THE PREFERRED EMBODIMENT

Figure 1:
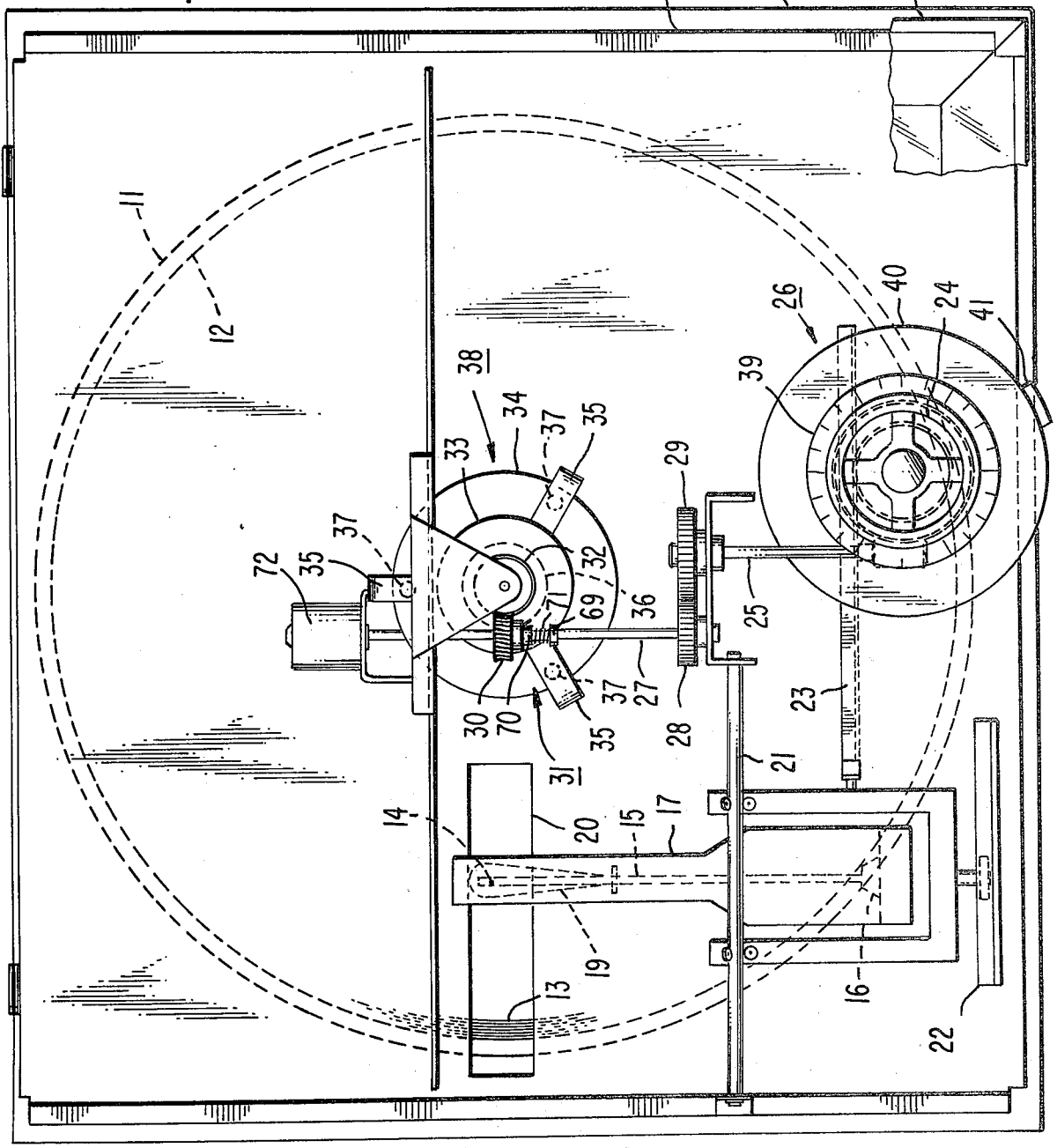
FIG. 1 is a plan view of a video disc system employing an overhead signal pickup drive pursuant to an embodiment of the present invention, and wherein the cover of the player is removed from the lid frame for clarity.

FIG. 1 illustrates a plan view of a video disc player including a base 10 having a turntable 11 rotatably mounted thereon. The player is suitable for use in a video disc system such as disclosed in the aforementioned Clemens' patent (U.S. Pat. No. 3,842,194). The surface of the turntable 11 is adapted to support a disc record 12. A motor and a suitable linkage mechanism (not shown) drives the turntable 11 at a predetermined speed when the player is operative. The rotational motion of the turntable 11 is transmitted to the disc record 12 via frictional contact between the turntable and the disc record. Video information is contained in geometric variations in the bottom of a smooth spiral groove 13 on the surface of the disc record 12. The disc surface includes a coating of conductive material which is preferably covered with a thin deposit of dielectric material. A signal pickup 14, subject to positioning in the groove 13, includes a conductive surface which cooperates with the conductive coating and the dielectric deposit of the disc record to form a capacitor. When a relative motion is established between the signal pickup 14 and the disc record 12, an edge of the conductive surface included in the signal pickup, while riding in the groove 13, recovers capacitive variations due to geometric variations in the bottom of the spiral groove. The capacitive variations, representative of prerecorded information on the disc record 12, are transmitted via a transmission line (such as taught in Hilliker's U.S. Pat. No. 3,872,265, issued on Mar. 18, 1975), to a suitable signal processing means. The signal pickup 14 is carried by the free end of a pickup arm 15. The pivoted end of the pickup arm 15 is movably connected, as shown at 16, to a hollow box-like support housing 17.

As indicated before, in order to effectively shield high frequency transmission line, including the conductive pickup arm 15 and the conductive support housing 17, the support housing is enclosed in a semipermanently sealed lid frame 18 containing at least a thin layer of sheet metal or screening for preventing deleterious interference with the surrounding electronic equipment. Apertures 19 and 20 are provided in the bottom walls of, respectively, the support housing 17 and the lid frame 18 to permit the signal pickup 14 to engage the disc record groove 13 when the player is operative.

As described earlier, relatively fragile walls of video disc record groove (for example, is a disc record having 4,000 to 6,000 grooves per inch) cannot be dependably relied upon for the radial tracking of the signal pickup 14 across the recorded surface of the disc record 12. Therefore, it is desirable to employ a positive feed drive mechanism for providing the required radial tracking. Accordingly, a bearing means 21 and 22 are affixed to the lid frame 18 which permit reciprocating travel of the support housing 17. The bearing means 21 and 22 are so oriented that, when the lid 18 is secured onto the base 10, the plane of travel of the support housing 17 is substantially parallel to the turntable surface 11. One end of a rack 23 is connected to the support housing 17. The other end of the rack 23 engages a pinion 24. The pinion 24 is coupled to a first drive shaft 25 by a mechanism 26 (to be described later).

The first drive shaft 25 is rotatably connected to a second drive shaft 27 by a pair of gear wheels 28 and 29. The second drive shaft 27 is coupled to a wormwheel 30 by a mechanism 31 (to be described later). The wormwheel 30 engages a wormgear 32 rotatably suspended in the lid frame 18. A drive plate 33, connected to the wormgear 32, is also rotatably suspended in the lid frame 18 such that, when the lid is secured onto the base 10 for playback, the axis of rotation of the drive plate substantially coincides with the axis of rotation of the disc record 12. A centering collar 34 is concentrically suspended from the drive plate 33 by a plurality of spring elements 35. A plurality hole 36 is provided in the centering collar 34 for the purpose of aligning the axis of rotation of the centering collar with the axis of rotation of the disc record 12. A plurality of friction pads 37 are affixed to the centering collar, on the side opposing the drive plate 33, such that, when the lid 18 is secured onto the base 10, the friction pads are pressed against the unrecorded surface of the disc record 12 by the spring elements 35, and thereby enabling rotational movement of the disc record to be transmitted to the centering collar 34 and the wormgear 32 when the player is operative.

FIG. 2 illustrates a partial perspective view of the video disc system of FIG. 1. A cover 68 (shown disengaged from the lid frame 18) effectively shields the high frequency transmission line (such as shown in Hilliker's U.S. Pat. No. 3,872,265, issued on Mar. 18, 1975) including the support housing 17. A dial 39, connected to the pinion 24, is provided to indicate the position of the signal pickup 14 in relation to the disc record 12. A knurled thumbwheel 40 is coupled to the pinion 24 by a clutch mechanism (to be described later). After decoupling the pinion 24 from the drive shaft 25 by using a declutch level 41 to disengaging the signal pickup 14 from the disc record 12 the thumbwheel 40 may be used for adjusting the position of the signal pickup for the purpose of selecting a particular program on the disc record. Window slits 42, 43, and 44 are provided in the cover 68 for allowing, respectively, the dial 39, the thumbwheel 40, and the declutch level 41, to project out of the cover for indication of the signal pickup 14 position with respect to the disc record 12 and manual adjustment thereof.

FIG. 3 illustrates an oblique exploded view of the coupling 26 between the pinion 24 and the first drive shaft 25. FIG. 4 illustrates a sectional elevation of the coupling 26 along the line X—X in FIG. 3. Referring to FIGS. 3 and 4, a bearing post 45 is affixed to the frame 18 by a declutch rod 46. A component carrier 47 is rotatably mounted on the bearing post 45. The sleeve-like pinion 24, which engages the rack 23, is permanently attached to the lower segment 48 of the component carrier 47. The knurled thumbwheel 40 is rotatably supported by the bearing surface 49 of the component carrier 47. A disc clutch spring 50 is compressed between the thumbwheel 40 and a wormwheel carrier 51. The wormwheel carrier 51 is permanently affixed to the component carrier 47. Thus, the disc clutch spring 50 tends to transmit rotation of the thumbwheel 40 to the wormwheel carrier 51 and thereby to the component carrier 47, the pinion 24 and the rack 23, resulting in adjustment of the position of the signal pickup 14 in relation to the disc record 12. A second wormwheel 52 is rotatably supported on the wormwheel carrier 51. A second wormgear 53 is mounted on the first drive shaft 25 for engagement with the second wormwheel 52. The top surface of the wormwheel 52 is recessed to form a saucer-shaped cavity 54. A second drive plate 55, having a plurality of radial opening 56, is firmly affixed to the component carrier 47. A saucer-shaped clutch disc 57, with plurality of radial fingers 58, is slipped on the hub 59 of the second drive plate 55. The radial fingers 58 are threaded through the radial openings 56 and rest in the cavity 54 of the second wormwheel 52. A spring 60 is placed in an opening 61 provided at the top of the bearing post 47. A nut 62, and a washer 63, hold a cup 64 against the spring 60. The rim of the cup 64 rests against the clutch disc 57. When the declutch lever 41 is turned to "on" position, cam surfaces pull the declutch rod 46 and the cup 64 against the spring 60 to compress the clutch disc 57. As the clutch disc 57 is compressed, the tips of the radial fingers 58 are pressed against the inside diameter of the cavity 54 in the second wormwheel 52.

The operation of the coupling 26 between the pinion 24 and the first drive shaft 25 is as follows. The rotation of the first drive shaft 25 causes the rotation of the wormwheel 52 via the wormgear 53. When the declutch lever 41 is in the on position, the tips of the radial fingers 58 are pressed against the inside diameter of the cavity 54, and therefore, the rotation of the second wormwheel 52 is transmitted to the clutch disc 57. The radial fingers 58, being in engagement with the spokes of the second drive plate 55, transmit the rotation of the clutch disc 57 to the second drive plate firmly secured to the component carrier 47. The rotation of the component carrier 47 is transformed into a linear motion of the rack 23 by the pinion 24. The movement of the rack 24 results in radial movement of the signal pickup 14.

As illustrated in FIG. 4, the balls 65 (here, three in number) rest in the holes in the declutch lever 41 between the hemispherical cavities in the bottom of the lid frame 18 and a washer 66. A nut 67 affixes the assembly to the lid frame 18. As the declutch lever 41 is rotated, the balls 65 are pushed out of the hemispherical cavities and therefore move downward. The downward movement of the balls 65 cause downward movement of the washer 66, the nut 67, the declutch rod 46, the nut 62, the cup 64 and thereby compressing the clutch disc 57. As indicated before, the compression of the clutch disc 57 engages the second wormwheel 52 with the second drive plate 55, and thereby linking the first drive shaft 25 to the pinion 24.

After decoupling the clutch disc 57 from the second wormwheel 52 and disengaging the signal pickup 14 from the disc record 12, the thumbwheel 40 may be used to adjust the position of the signal pickup in relation to the disc record. The disc clutch spring 50, compressed between the thumbwheel 40 and the wormwheel carrier 51, firmly secured to the component carrier 47, tends to transmit the rotation of the thumbwheel to the component carrier, and thereby to the pinion 24. As indicated before, rotation of the pinion 24 results in a linear movement of the rack 23 and thereby radial movement of the signal pickup 14.

Figure 6A:
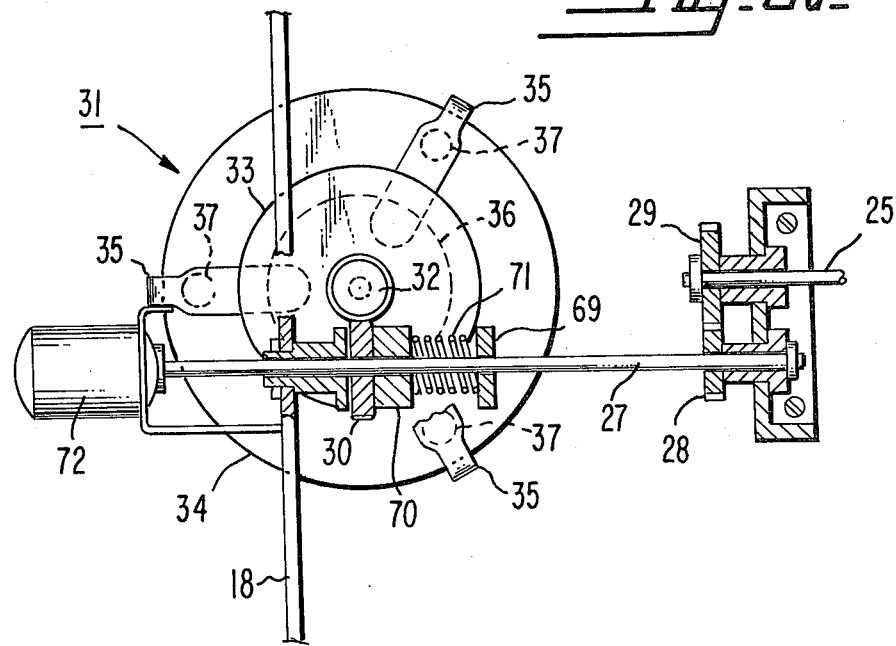
FIG. 6a is a sectional plan view of the overhead signal pickup drive shown in FIG. 5 along the line Y—Y in FIG. 5.
Figure 6B:
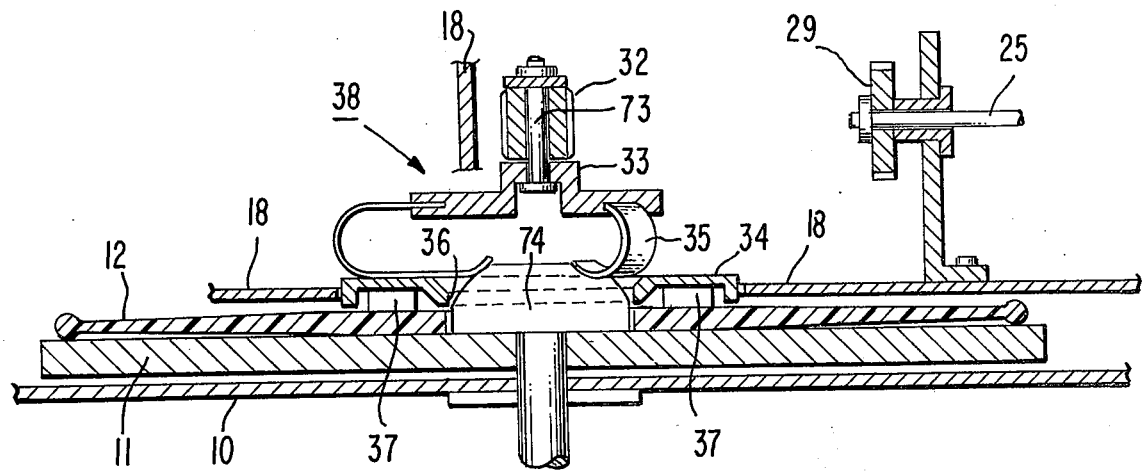
FIG. 6b is a sectional elevation of the overhead signal pickup drive shown in FIG. 5 along the line Z—Z in FIG. 5.

FIG. 5 illustrates a partial perspective view of the coupling 31, between the second drive shaft 27 and the wormwheel 30, and an arrangement by which the rotation of the disc record 12 is transferred to the wormwheel 30 via a clutch mechanism 38. FIG. 6a is a sectional plan view of the coupling 31 of FIG. 5 along the line Y—Y in FIG. 5. FIG. 6b is a sectional elevation of the clutch mechanism 38 along the line Z—Z in FIG. 5.

Referring now to FIGS. 5 and 6a, the coupling 31 includes a first collar 69 securely fastened to the second drive shaft 27. A second collar 70 is positioned between the wormwheel 30 and the first collar 69. The second collar 70 is free to slide along the second drive shaft 27. However, the second collar 70 is not free to rotate relative to the second drive shaft 27. A spring 71 coupled between the first collar 69 and the second collar 70 continuously urges the second collar against the wormwheel 30. The frictional engagement of the mating surfaces of the second collar 70 and the wormwheel 30 tends to transmit rotation of the wormwheel 30 to the second drive shaft 27.

A motor 72 is coupled to the drive shaft 27 for overriding the motion transmitted, to the drive shaft 27 by the clutch mechanism 38, for enabling a rapid return of the support housing 17 to the rest position at the end of a playback cycle after the signal pickup 14 is disengaged from the disc record groove 13. The slippage between the wormwheel 30 and the second collar 70 accommodates the speed differential between the predetermined speed of the wormwheel and the rapid return speed of the second drive shaft 27. When the power is cut off to the motor 72, the rotor of the remote motor idly rides with the second drive shaft 27.

In video disc systems of the Clemens' type it is desirable, for accurate reproduction of the prerecorded signals from the disc record 12, to maintain a relatively constant attitude of the signal pickup 14 in the information groove 13. The attitude of the signal pickup 14 may be fixedly maintained in the groove 13 by driving the pickup arm support 16 at a speed (hereinafter, the predetermined speed) such that the pickup arm 15 remains substantially tangential to the groove at the point of engagement of the signal pickup with the groove during playback. The predetermined speed of the signal pickup drive, being a function of the grooves per inch and revolutions per minute of the disc record 12, may vary from time to time. A novel servo system is employed (as illustrated in FIG. 7) to maintain a relatively constant attitude of the signal pickup 14 in the groove 13 despite the variations in the disc record speed and the disc record groove density. The linkages of the drive mechanism are chosen such that, the support housing 17 carrying the pickup arm support 16 tends to travel at a speed slightly higher than the maximum predetermined speed of the signal pickup 14. A photosensitive detector 75 is employed for providing error signal indicative of the deviation of the position of the pickup arm 15 in relation to the support housing 17. The support housing 17 maintains a relatively constant attitude with respect to a direction tangential to the disc record groove 13 at the point of engagement of the signal pickup 14 with the groove. A solenoid 77, responsive to the error signal, is provided for affecting the operation of the drive mechanism in a manner that minimizes the error signal.

As illustrated in FIG. 7, the photosensitive detector 75 is located in the support housing 17 under the pickup arm 15. The photosensitive detector 75 output signal is coupled to an error signal processing circuit 76. The signal processing circuit 76 output activates the solenoid 77, to adjust the slippage between the wormwheel 30 and the second collar 70, in a manner that opposes the error signal.

Referring now to FIGS. 5 and 6-b, the clutch mechanism 38 includes the drive plate 33 suspended by a pin 73 from the lid frame 18. When the lid frame 18 is secured onto the base 10 for playback, the centering hole 36 of the centering collar 34 engages the outside diameter of a hub 74, affixed to the turntable 11, for aligning the axis of rotation of the disc record 12 with the axis of rotation of the centering collar. When the player is operative, the engagement between the friction pads 37 and the unrecorded surface of the disc record 12 transmits rotational motion of the disc record to the centering collar 34, the drive plate 33, the pin 73, and the wormgear 32.

Thus, the rotational motion of the disc record 12 is transmitted to the wormwheel 30, via the wormgear 32, by the clutch mechanism 38. The motion of the wormwheel 30 is transmitted to the second drive shaft 27 by the coupling 31. The second drive shaft 27 drives the second wormgear 53, secured to the first drive shaft 25, through the pair of gear wheels 28 and 29. The motion of the second wormgear 53 is transmitted to the pinion 24 via the coupling 26. The pinion 24 drives the support housing 17 through the rack 23.

The thumbwheel 40 is used to adjust the position of the signal pickup 14 in relation to the disc record 12 for the purpose of selecting a particular program. The motor 72 is used for a rapid return of the support housing 17 to the rest position after a playback cycle. The servo system is used to maintain a relatively constant attitude of the signal pickup 14, in the groove 13, during playback.

The lid frame 18 and the cover 68 effectively shields the high frequency transmission line minimizing deleterious radiation effects on the surrounding electronic equipment.

Thus, the novel feed drive mechanism, pursuant to the principles of the present invention, provides a low cost, reliable and simple arrangement compatible with the requirements of video disc systems.

What is claimed is:
1. In a playback system including a turntable rotatably mounted on a base for supporting a disc record; said disc record having a centering aperture and a spiral groove with information recorded therein; said turntable having a centering hub for concentric alignment of said disc record; a support housing carrying a signal pickup which is subject to positioning in said spiral groove; a lid hinged to said base for supporting said support housing; an overhead signal pickup drive comprising:
   bearing means affixed to said lid for supporting travel of said support housing within said lid; said bearing means being so oriented that said travel of said support housing results in a motion of said signal pickup along a path radially disposed relative to the axis of rotation of said turntable;
   a rack having one end connected to said support housing;
   a pinion rotatably mounted in said lid in engagement with said rack;
   a drive shaft also rotatably supported in said lid coupled to said pinion;
   a wormwheel rotatably mounted in said lid coupled to said drive shaft;
   a wormgear rotatably suspended in said lid in engagement with said wormwheel;
   a drive plate also rotatably suspended in said lid in engagement with said wormgear; wherein said drive plate is suspended such that when said lid is secured onto said base, the axis of rotation of said drive plate is substantially coincident with the axis of rotation of said turntable;

a centering collar concentrically suspended by a plurality of spring elements from said drive plate; wherein the inside diameter of said centering collar is slightly greater than the outside diameter of said turntable hub permitting a smooth engagement of said collar with said hub when said lid is secured onto said base for playback; and a plurality of friction pads affixed to said centering collar on the side opposing said drive plate; wherein when said lid is secured onto said base, said friction pads are pressed by said spring elements against the unrecorded surface of said disc record, and thereby transmitting rotational motion of said disc record to said centering collar for causing said travel of said support housing carrying said signal pickup.

2. A system as defined in claim 1 wherein said wormwheel is freely mounted on said drive shaft and said coupling between said wormwheel and said drive shaft comprises a clutch mechanism including:

a first collar securely fastened to said drive shaft;

a second collar mounted on said drive shaft and positioned between said wormwheel and said first collar, wherein said second collar is free to slide along said drive shaft, and wherein said second collar is not free to rotate relative to said drive shaft; and a spring member coupled between said first and second collars urging said second collar to bear against said wormwheel, and wherein frictional engagement of the mating surfaces of said second collar and said wormwheel tend to transmit rotational movement between said wormwheel and said drive shaft.

3. In a system as defined in claim 2 wherein it is desirable to drive said signal pickup at a speed such that said pickup arm carrying said signal pickup remains substantially tangential to the spiral groove at the point of engagement of said signal pickup with said disc record groove during playback, and wherein the desirable speed being a function of grooves per inch and revolutions per minute of said disc record varies from time to time, and wherein said support housing carrying said signal pickup is driven at a speed slightly higher than the maximum desirable speed; a servo system comprising:

error generating means for providing error signal indicative of the deviation of the axis of said pickup arm from a direction tangential to said spiral groove at the point of engagement of said signal pickup with said groove; and adjusting means responsive to said error signal for changing the contact pressure between the mating surfaces of said wormwheel and said second collar, and thereby varying the extent of slip motion between said wormwheel and said drive shaft in a manner that minimizes said error signal.

4. A system as defined in claim 3 wherein said error generating means provide an error signal indicative of the position of said pickup arm in relation to said support housing, which support housing maintains a relatively constant attitude with respect to a direction tangential to said spiral groove at the point of engagement of said signal pickup with said disc groove.

5. A system as defined in claim 4 wherein said error generating means include a photosensitive detector.

6. A system as defined in claim 5 wherein said adjusting means include a solenoid for adjusting the position of said second collar with respect to said drive shaft for varying the contact pressure between the mating surfaces of said wormwheel and said second collar in a manner that minimizes said error signal.

7. A system as defined in claim 6 further including an overhead signal pickup drive override system including:

a motor coupled to said drive shaft such that when said motor is switched on, said motor overrides the rotational motion of said drive shaft obtained from said disc record by means of said overhead signal pickup drive for enabling a rapid approach or return of said support housing when said signal pickup is disengaged from said disc record groove.

8. A system as defined in claim 1 wherein said coupling between said pinion and said drive shaft comprises a second clutch mechanism including;

a second wormgear secured to said drive shaft;

a second wormwheel mounted coaxially with said pinion and in engagement with said second wormgear, wherein said second wormwheel is free to rotate relative to said pinion, and wherein said second wormwheel has on one side thereof a recessed face forming a cavity;

a second drive plate firmly secured to said pinion adjacent to said second wormwheel on the side of said cavity, and having a plurality of radial openings;

a generally saucer-shaped clutch disc with a plurality of radial fingers, wherein said fingers are threaded through said openings in said second drive plate and rest in said cavity, and wherein the outside diameter of said radial fingers can be increased by compressing said clutch disc to press the tips of said radial fingers against the inside diameter of said cavity in said second wormwheel, and thereby transmitting rotational movement of said second wormgear secured to said drive shaft to said second drive plate secured to said pinion via said clutch disc; and an activating lever for compressing said saucer-shaped clutch disc in order to increase the diameter of said radial fingers, and thereby engaging said second wormwheel with said second drive plate.

9. A system as defined in claim 8 further including a support housing position adjusting mechanism comprising:

a third drive plate firmly secured to said pinion;

a thumbwheel mounted on said pinion free to rotate relative to said pinion;

a generally saucer-shaped second clutch disc compresed between said third drive plate and said thumbwheel tending to transmit rotational movement of said thumbwheel to said third drive plate secured to said pinion, and thereby causing said support housing connected to said rack engaged with said pinion to change the support housing position in relation to said disc record.

10. A system as defined in claim 9 wherein a dial is attached to said pinion to indicate the position of said support housing in relation to said disc record.

11. In a playback system for recovering prerecorded information from a spirally grooved disc record by a signal pickup; said playback system including a turntable rotatably mounted on a base for supporting said disc record; a support housing for carrying said signal pickup which is subject to positioning in said spiral groove; a hinged lid; an overhead signal pickup drive comprising:

bearing means secured to said lid for supporting translational motion of said support housing within said lid; said bearing means being so oriented that said translational motion of said support housing results in a motion of said signal pickup along a path radially disposed relative to the axis of rotation of said turntable;

a drive plate rotatably suspended in said lid; wherein said drive plate is suspended such that when said lid is secured onto said base, the axis of rotation of said drive plate is substantially coincident with the axis of rotation of said turntable;

a plurality of friction pads coupled to said drive plate; wherein said friction pads are pressed against the unrecorded surface of said disc record, when said lid is secured onto said base, thereby transmitting rotational motion of said disc record to said drive plate when the playback system is operative; and means coupled between said drive plate and said support housing for translating rotational motion of said drive plate into translational motion of said support housing over a limited range defined by a first end position and a second end position; said end positions of said support housing being such that said signal pickup overlies said disc record throughout said translational motion of said support housing between said end positions.

12. A system as defined in claim 11 wherein said coupling between said friction pads and said drive plate comprises:

a collar concentrically suspended by a plurality of spring elements from said drive plate, and wherein said plurality of friction pads are affixed to said centering collar on the side opposing said drive plate.

13. A system as defined in claim 12 wherein said collar has an opening which engages said turntable centering hub when said lid is secured onto said base, and thereby aligning axes of rotation of said drive plate and said turntable.

14. A system as defined in claim 11 wherein said translating means comprises:

a rack having one end connected to said support housing;

a pinion rotatably mounted in said lid in engagement with said rack; and means for coupling said pinion with said drive plate.

15. A system as defined is claim 14 wherein said means for coupling said pinion with said drive plate comprises:

a drive shaft rotatably supported in said lid coupled to said pinion;

a wormwheel rotatably mounted in said lid coupled to said drive shaft; and a wormgear secured to said drive plate in engagement with said wormwheel.

* * * * *